US012243185B2

(12) United States Patent
Zhu et al.

(10) Patent No.: US 12,243,185 B2
(45) Date of Patent: Mar. 4, 2025

(54) SYSTEMS AND METHODS FOR POINT CLOUD REGISTRATION

(71) Applicant: THE REGENTS OF THE UNIVERSITY OF MICHIGAN, Ann Arbor, MI (US)

(72) Inventors: Minghan Zhu, Ann Arbor, MI (US); Maani Ghaffari, Ann Arbor, MI (US); Huei Peng, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 336 days.

(21) Appl. No.: 17/852,636

(22) Filed: Jun. 29, 2022

(65) Prior Publication Data
US 2022/0414821 A1   Dec. 29, 2022

Related U.S. Application Data

(60) Provisional application No. 63/216,042, filed on Jun. 29, 2021.

(51) Int. Cl.
  *G06K 9/00*   (2022.01)
  *G06T 3/14*   (2024.01)
  *G06T 7/33*   (2017.01)
(52) U.S. Cl.
  CPC .............. *G06T 3/14* (2024.01); *G06T 7/344* (2017.01); *G06T 2207/10028* (2013.01); *G06T 2207/20084* (2013.01); *G06T 2207/30252* (2013.01)

(58) Field of Classification Search
  None
  See application file for complete search history.

(56) References Cited

U.S. PATENT DOCUMENTS

2022/0084221 A1* 3/2022 Deng ................. G06V 10/7715

OTHER PUBLICATIONS

Spezialetti et al., "Learning to orient surfaces by self-supervised spherical CNNs" (Year: 2020).*
Ao, S. et al., SpinNet: Learning a General Surface Descriptor for 3D Point Cloud Registration, In Proceedings of the IEEE/CVF Conference on Computer Vision and Pattern Recognition, 2021, pp. 11753-11762.
Aoki, Y. et al., PointNetLK: Robust & Efficient Point Cloud Registration Using Pointnet, In Proceedings of the IEEE/CVF Conference on Computer Vision and Pattern Recognition, 2019, pp. 7163-7172.
Bai, Y. et al., D3Feat: Joint Learning of Dense Detection and Description of 3D Local Features, In Proceedings of the IEEE/CVF Conference on Computer Vision and Pattern Recognition, 2020, pp. 6359-6367.

(Continued)

*Primary Examiner* — SJ Park
(74) *Attorney, Agent, or Firm* — Quarles & Brady LLP

(57) ABSTRACT

Systems and methods are provided for point cloud processing with an equivariant neural network and implicit shape learning that may produce correspondence-free registration. The systems and methods may provide for feature space preservation with the same rotation operation as a Euclidean input space, due to the equivariance property, which may provide for solving the feature-space registration in a closed form.

20 Claims, 4 Drawing Sheets

(56) References Cited

OTHER PUBLICATIONS

Besl, P. et al., A Method for Registration of 3-D Shapes, IEEE Transactions on Pattern Analysis and Machine Intelligence, 1992, 14(2):239-256.

Censi, A., An ICP Variant Using a Point-to-Line Metric, In 2008 IEEE International Conference on Robotics and Automation, 2008, pp. 19-25.

Chen, Y. et al., Object Modelling by Registration of Multiple Range Images, Image and Vision Computing, 1992, 10(3):145-155.

Choy, C. et al., Fully Convolutional Geometric Features, In Proceedings of the IEEE/CVF International Conference on Computer Vision, 2019, pp. 8958-8966.

Choy, C. et al., Deep Global Registration, In Proceedings of the IEEE/CVF Conference on Computer Vision and Pattern Recognition, 2020, pp. 2514-2523.

Cohen, T. et al., Learning the Irreducible Representations of Commutative Lie Groups, In International Conference on Machine Learning, PMLR, 2014, pp. 1755-1763.

Cohen, T. et al., Steerable CNNs, arXiv: 1612.08498, 2016, 14 pages.

Deng, H. et al., PPFNnet: Global Context Aware Local Features for Robust 3D Point Matching, In Proceedings of the IEEE Conference on Computer Vision and Pattern Recognition, 2018, pp. 195-205.

Deng, C. et al., Vector Neurons: A General Framework for SO(3)-Equivariant Networks, In Proceedings of the IEEE/CVF International Conference on Computer Vision, 2021, p. 12200-12209.

Esteves, C. et al., Learning SO(3) Equivariant Representations with Spherical CNNs, In Proceedings of the European Conference on Computer Vision (ECCV), 2018, pp. 52-68.

Finzi, M. et al., Generalizing Convolutional Neural Networks for Equivariance to Lie Groups on Arbitrary Continuous Data, in International Conference on Machine Learning, PMLR, 2020, pp. 3165-3176.

Fuchs, F. et al., SE(3)-Transformers: 3D Roto-Translation Equivariant Attention Networks, Advances in Neural Information Processing Systems, 2020, 33:1970-1981.

Ghaffari, M. et al., Continuous Direct Sparse Visual Odometry from RGB-D Images, Robotics: Science and Systems, 2019, 9 pages.

Gojcic, Z. et al., The Perfect Match: 3D Point Cloud Matching with Smoothed Densities, In Proceedings of the IEEE/CVF Conference on Computer Vision and Pattern Recognition, 2019, pp. 5545-5554.

Gold, S. et al., New Algorithms for 2D and 3D Point Matching: Pose Estimation and Correspondence, Pattern Recognition, 1998, 31(8):1019-1031.

Granger, S. et al., Multi-scale EM-ICP: A Fast and Robust Approach for Surface Registration, In Computer Vision—ECCV 2002: 7th European Conference on Computer Vision, 2002, pp. 418-432.

Horn, B. et al., Closed-Form Solution of Absolute Orientation Using Orthonormal Matrices, Journal of the Optical Society of America A, 1988, 5(7):1127-1135.

Huang, X. et al., Feature-Metric Registration: A Fast Semi-supervised Approach for Robust Point Cloud Registration without Correspondences, In Proceedings of the IEEE/CVF Conference on Computer Vision and Pattern Recognition, 2020, p. 11366-11374.

Huang, J. et al., DI-Fusion: Online Implicit 3D Reconstruction with Deep Priors, In Proceedings of the IEEE/CVF Conference on Computer Vision and Pattern Recognition, 2021, pp. 8932-8941.

Kondor, R. et al., On the Generalization of Equivariance and Convolution in Neural Networks to the Action of Compact Groups, In International Conference on Machine Learning, PMLR, 2018, pp. 2747-2755.

Lang, I. et al., SampleNet: Differentiable Point Cloud Sampling, In Proceedings of the IEEE/CVF Conference on Computer Vision and Pattern Recognition, 2020, pp. 7578-7588.

Li, J. et al., USIP: Unsupervised Stable Interest Point Detection from 3D Point Clouds, In Proceedings of the IEEE/CVF International Conference on Computer Vision, 2019, pp. 361-370. 2019.

Lu, W. et al., DeepVCP: An End-to-End Deep Neural Network for Point Cloud Registration, In Proceedings of the IEEE/CVF International Conference on Computer Vision, 2019, pp. 12-21.

Mescheder, L. et al., Occupancy Networks: Learning 3D Reconstruction in Function Space, In Proceedings of the IEEE/CVF Conference on Computer Vision and Pattern Recognition, 2019, pp. 4460-4470.

Mildenhall, B. et al., NeRF: Representing Scenes as Neural Radiance Fields for View Synthesis, arXiv:2003.08934, 2020, 25 pages.

Mitra, N. et al., Registration of Point Cloud Data from a Geometric Optimization Perspective, In Proceedings of the 2004 Eurographics/ACM SIGGRAPH Symposium on Geometry Processing, 2004, pp. 22-31.

Pais, G. et al., 3DRegNet: A Deep Neural Network for 3D Point Registration, In Proceedings of the IEEE/CVF Conference on Computer Vision and Pattern Recognition, 2020, pp. 7193-7203.

Park, J. et al., DeepSDF: Learning Continuous Signed Distance Functions for Shape Representation, In Proceedings of the IEEE/CVF Conference on Computer Vision and Pattern Recognition, 2019, pp. 165-174.

Qi, C. et al., PointNet: Deep Learning on Point Sets for 3D Classification and Segmentation, In Proceedings of the IEEE Conference on Computer Vision and Pattern Recognition, 2017, pp. 652-660.

Sarode, V. et al., PCRNet: Point Cloud Registration Network Using PointNet Encoding, arXiv preprint arXiv:1908.07906, 2019, pp. 1-10.

Segal, A. et al., Generalized-ICP, In Robotics: Science and Systems, 2009, 2(4):435, 8 pages.

Shotton, J. et al., Scene Coordinate Regression Forests for Camera Relocalization in RGB-D Images, In Proceedings of the IEEE Conference on Computer Vision and Pattern Recognition, 2013, pp. 2930-2937.

Stutz, D. et al., Learning 3D Shape Completion Under Weak Supervision, International Journal of Computer Vision, 2020, 128:1162-1181.

Wang, Y. et al., Deep Closest Point: Learning Representations for Point Cloud Registration, In Proceedings of the IEEE/CVF International Conference on Computer Vision, 2019, pp. 3523-3532.

Wang, Y. et al., Dynamic Graph CNN for Learning on Point Clouds, ACM Transactions on Graphics, 2019, vol. 38, No. 5, Article 146, pp. 1-12.

Wang, Y. et al., PRNet: Self-Supervised Learning for Partial-to-Partial Registration, Advances in Neural Information Processing Systems, 2019, 32:8814-8826.

Wedderburn, R., Quasi-likelihood Functions, Generalized Linear Models, and the Gauss-Newton Method, Biometrika, 1974, 61(3):439-447.

Wu, Z. et al., 3D ShapeNets: A Deep Representation for Volumetric Shapes, In Proceedings of the IEEE Conference on Computer Vision and Pattern Recognition, 2015, pp. 1912-1920.

Yen-Chen, L. et al., iNeRF: Inverting Neural Radiance Fields for Pose Estimation, arXIV:2012.05877, 2021, 10 pages.

Yew, Z. et al., 3DFeat-Net: Weakly Supervised Local 3D Features for Point Cloud Registration, In Proceedings of the European Conference on Computer Vision (ECCV), 2018, pp. 607-623.

Yew, Z. et al., RPM-Net: Robust Point Matching Using Learned Features, In Proceedings of the IEEE/CVF Conference on Computer Vision and Pattern Recognition, 2020, pp. 11824-11833.

Yuan, W. et al., DeepGMR: Learning Latent Gaussian Mixture Models for Registration, In Computer Vision-ECCV, 2020, pp. 733-750.

Zeng, A. et al., 3DMatch: Learning Local Geometric Descriptors from RGB-D Reconstructions, In Proceedings of the IEEE Conference on Computer Vision and Pattern Recognition, 2017, pp. 1802-1811.

Zhang, R. et al., A New Framework for Registration of Semantic Point Clouds from Stereo and RGB-D Cameras, arXiv:2012.03683, 2020, 8 pages.

\* cited by examiner

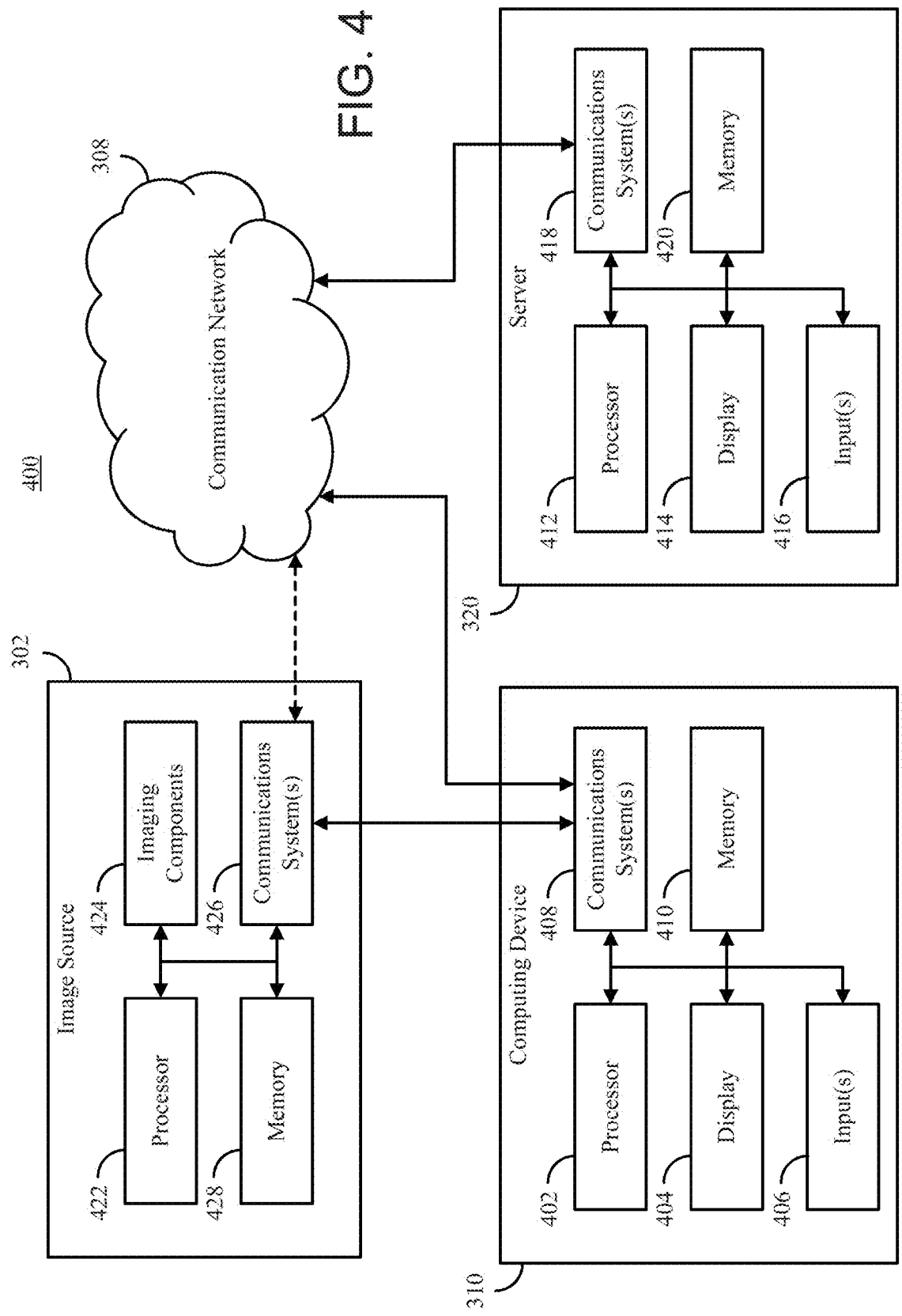

SYSTEMS AND METHODS FOR POINT CLOUD REGISTRATION

CROSS-REFERENCE TO RELATED APPLICATIONS

This application claims the benefit of U.S. Provisional Patent Application Ser. No. 63/216,042 filed on Jun. 29, 2021 and entitled "Correspondence-Free Point Cloud Registration with SO(3)-Equivalent Implicit Shape Representations," which is incorporated herein by reference as if set forth in its entirety for all purposes.

STATEMENT REGARDING FEDERALLY SPONSORED RESEARCH

Not Applicable.

BACKGROUND

Point clouds are a major form of 3D information representation in perception with numerous applications today, including intelligent robots and self-driving cars. The registration of two different point clouds capturing the same underlying object or scene refers to estimating the relative transformation that aligns them. Point cloud registration enables information aggregation across several observations, which is essential for many tasks such as mapping, localization, shape reconstruction, and object tracking. Given perfect point-to-point pairings between the point-cloud-pair, the relative transformation can be solved in closed-form using Horn's method [Ref. 1].

However, such a pairing is not available or is corrupted in real-world problems, posing a significant challenge for the point cloud registration task, namely data association. ICP matches the closest points in Euclidean space and iteratively updates the matching using the current pose estimation [Ref. 2]. In the deep learning era, the strong feature learning capacity of neural networks enables better description and discrimination of points, improving their matching. Overall, these methods can be categorized as correspondence-based registration.

An alternative approach, called correspondence-free registration, is designed to circumvent the matching of points [Ref. 3] by learning a global representation for the entire point cloud and estimating the transformation by aligning their representations. Similar to correspondence-based registration, correspondence-free registration can also be performed with or without the involvement of deep learning. The main obstacle in this approach is that the mapping between the input Euclidean space and the output feature space realized by neural networks is nonlinear and obscure. Thus it is common to rely on iterative optimization methods with local linearization such as Gauss-Newton [Ref. 4]. The performance of these approaches deteriorates when the initial pose difference gets larger. A method is called global if the registration result is independent of initial pose, or local otherwise [Ref. 5]. Most existing correspondence-free methods are local.

Thus there remains a need for point cloud processing that preserves the rotation operation, is robust to noise in the point cloud, and may be applied to real-world applications.

SUMMARY OF THE DISCLOSURE

The present disclosure addresses the aforementioned drawbacks by providing point cloud processing with an equivariant neural network and implicit shape learning that may produce correspondence-free registration. The systems and methods may provide for feature space preservation with the same rotation operation as a Euclidean input space, due to the equivariance property, which may provide for solving the feature-space registration in a closed form, such as by using Horn's method. In some configurations, the systems and methods may be global, such as being invariant to the initial pose difference. Registration robustness may be improved against noise in point clouds to better handle challenges in real-world applications through training the features for both the implicit shape reconstruction and registration tasks. The implicit shape learning may encourage the network to learn features describing the underlying geometry rather than specific points sampled on the geometry, such that the features are better prepared for registration by including the registration in the training loop.

In one aspect, a method is provided for point cloud registration. The method includes accessing point cloud input data that includes at least a first point cloud and a second point cloud. The second point cloud is rotated from the first point cloud about an origin. The method includes subjecting the point cloud input data to an equivariant encoder to extract features from the point cloud input data. The method also includes performing shape reconstruction by subjecting the extracted features to a decoder and performing registration in feature space by aligning the decoded features for the first point cloud and second point cloud. The method also includes determining an optimized rotation matrix to translate between the first point cloud and the second point cloud.

In one version of the method, the point cloud registration is correspondence-free and includes SO(3)-equivariance representation learning with a neural network. In one version of the method, the point cloud registration generates a closed-form solution.

The method may further comprise determining an occupancy value prediction. The occupancy value prediction can include where the decoder uses an encoded shape feature and a queried position in a feature space.

The method may further comprise determining a loss in the shape reconstruction given by:

$$L_{OCC} = \sum_{i=1}^{n} L_{cross\_entropy}(v(p_i; f(P)), v_{gt}(p_i)),$$

where $L_{occ}$ represents occupancy value loss, $v_{gt}(p) \in \{0; 1\}$ represents a ground truth occupancy value of a query point p; $f(P_1)$; $f(P_2)$, represents a feature of the point clouds $P_1$; $P_2$.

In one version of the method, the optimized rotation matrix is determined using a singular value decomposition (SVD). In one version of the method, the point cloud registration is independent of at least one of initial rotation error, input point clouds, noise, sampling, and density differences. In one version of the method, the point cloud registration is performed using a neural network.

In one version of the method, the point cloud registration is performed by a vehicle system to control autonomous driving.

In one aspect, a system is provided for point cloud registration. The system includes a computer system configured to: i) access point cloud input data that includes at least a first point cloud and a second point cloud, wherein the second point cloud is rotated from the first point cloud about an origin; ii) subject the point cloud input data to an equivariant encoder to extract features from the point cloud input data; iii) perform shape reconstruction by subjecting the extracted features to a decoder; iv) perform registration in feature space by aligning the decoded features for the first point cloud and second point cloud; v) determine an optimized rotation matrix to translate between the first point cloud and the second point cloud.

In one version of the system, the point cloud registration is correspondence-free and includes SO(3)-equivariance representation learning with a neural network. In one version of the system, the point cloud registration generates a closed-form solution. In one version of the system, the computer system is further configured to determine an occupancy value prediction. In one version of the system, occupancy value prediction includes where the decoder uses an encoded shape feature and a queried position in a feature space.

In one version of the system, the computer system is further configured to determine a loss in the shape reconstruction given by:

$$L_{OCC} = \sum_{i=1}^{n} L_{cross\_entropy}(v(p_i; f(P)), v_{gt}(p_i)),$$

where $L_{occ}$ represents occupancy value loss, $v_{gt}(p) \in \{0; 1\}$ represents a ground truth occupancy value of a query point p; $f(P_1)$; $f(P_2)$, represents a feature of the point clouds $P_1$; $P_2$.

In one version of the system, the computer system is further configured to determine the optimized rotation matrix using a singular value decomposition (SVD).

In one version of the system, the point cloud registration is independent of at least one of initial rotation error, input point clouds, noise, sampling, and density differences.

In one version of the system, the computer system is further configured to perform point cloud registration using a neural network.

In one version of the system, the computer system is further configured to perform point cloud registration with a vehicle system to control autonomous driving.

The foregoing and other aspects and advantages of the present disclosure will appear from the following description. In the description, reference is made to the accompanying drawings that form a part hereof, and in which there is shown by way of illustration an example embodiment. This embodiment does not necessarily represent the full scope of the invention, however, and reference is therefore made to the claims and herein for interpreting the scope of the invention. Like reference numerals will be used to refer to like parts from Figure to Figure in the following description.

BRIEF DESCRIPTION OF THE DRAWINGS

FIG. 4. is a diagram of a non-limiting example hardware that can be used to implement the system of FIG. 3 in accordance with some embodiments of the disclosed subject matter.

DETAILED DESCRIPTION

Figure 1:
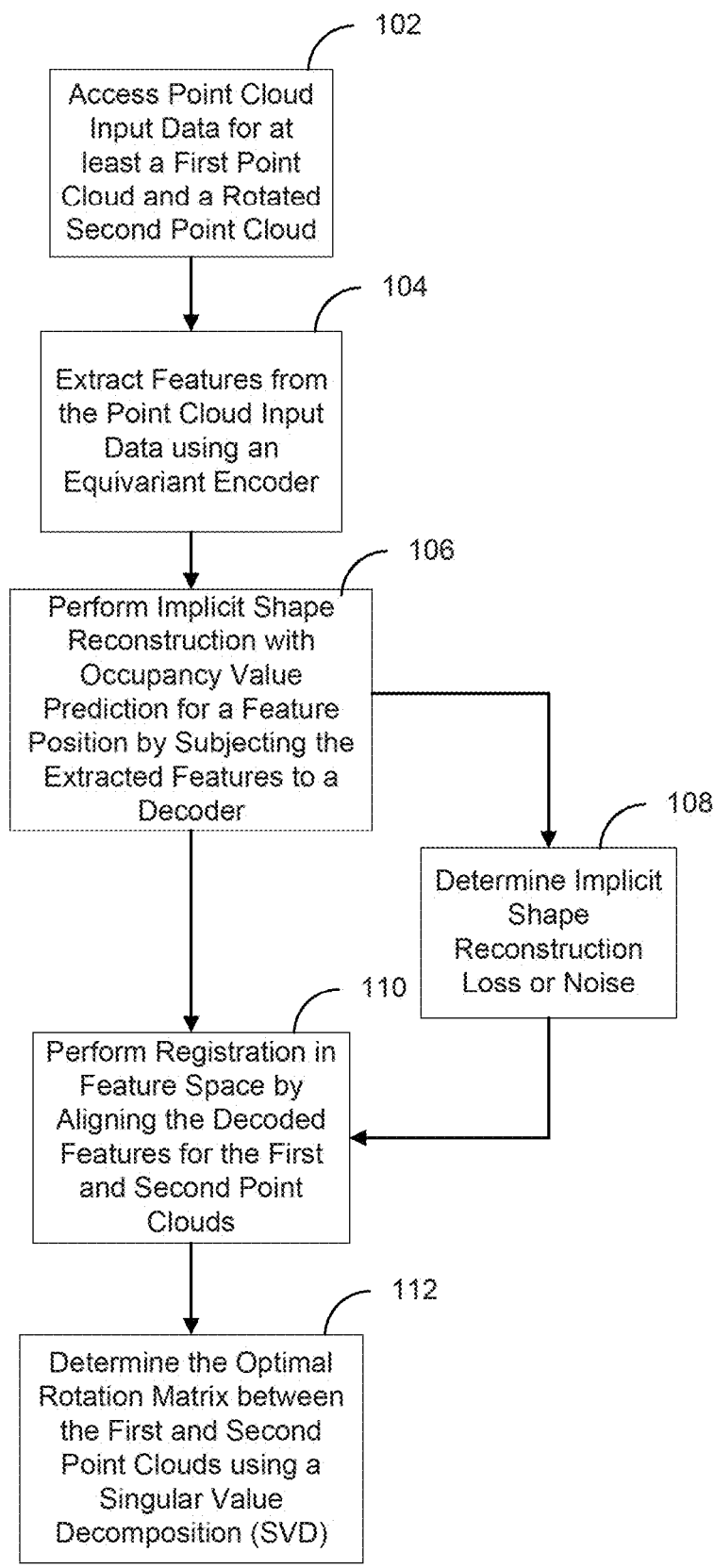
FIG. 1 shows non-limiting example steps for a method of point cloud registration.

Systems and methods are provided for point cloud processing with an equivariant neural network and implicit shape learning that may produce correspondence-free registration. The systems and methods may provide for feature space preservation with the same rotation operation as a Euclidean input space, due to the equivariance property, which may provide for solving the feature-space registration in a closed form, such as by using Horn's method.

In some configurations, the systems and methods may be global, such as being invariant to the initial pose difference. Registration robustness may be improved against noise in point clouds to better handle challenges in real-world applications through training the features for both the implicit shape reconstruction and registration tasks. The implicit shape learning may encourage the network to learn features describing the underlying geometry rather than specific points sampled on the geometry, such that the features are better prepared for registration by including the registration in the training loop.

A shape registration method may achieve advantages through combining equivariant feature learning with implicit shape models. In some configurations, the necessity of data association may be removed because of the permutation-invariant property in network architectures similar to PointNet. Registration in feature space can also be solved in closed-form using Horn's method due to the SO(3)-equivariance property. Registration may also be robust to noise in the point cloud because of joint training of registration and implicit shape reconstruction. Superior performance may also be achieved in comparison with existing, conventional correspondence-free deep registration methods.

In some configurations, a correspondence-free point cloud registration method is used with a SO(3)-equivariance representation learning and closed-form pose estimation. The equivariant network may preserve the SO(3)-equivariance property. In some configurations, a method in accordance with the present disclosure may be global, delivering consistent registration regardless of initial rotation error. The systems and methods may be robust against imperfections in input point clouds, including noise, sampling, and density differences.

Symmetry, or its equivariance, in a neural network is an important ingredient for efficient learning and generalization. It also allows building a clearer connection between the changes in the input space and the output space. In some configurations, convolutional neural networks are translation-equivariant. Symmetry may make a network generalize to image shifting and enables huge parameter savings. Conventionally, symmetries are not explored. For example, most point cloud processing networks (e.g., Point-Net [Ref. 6], DGCNN [Ref. 7]) are not equivariant to rotations.

In some configurations, Vector Neuron layers [Ref. 8] may be used to enable rotation-equivariant feature learning for point clouds. Equivariance and the design of layers is described below.

A function f:X→X is equivariant to a set of transformations G, if for any g∈G, f and g commutes, i.e., g·f(x)=f(g·x); ∀x∈X. In a non-limiting example, applying a translation on a 2D image and then going through a convolution layer may be identical to processing the original image with a convolution layer and then shifting the output feature map. Convolution layers are translation equivariant.

Vector Neurons may be used to extend the equivariance property to SO(3) rotations for point cloud neural networks. The scalar feature may be augmented in each feature dimension to a vector in $R^3$ and the linear, nonlinear, pooling, and normalization layers may be redesigned accordingly. In a regular network, the feature matrix with feature dimension C corresponding to a set of N points is $V \in R^{N \times C}$. In Vector Neuron networks, the feature matrix is of form $V \in R^{N \times C \times 3}$. The mapping between layers can be written as $f: R^{N \times C_l \times 3} \to R^{N \times C_{l+1} \times 3}$ where l is the layer index. Following this design, the representation of SO(3) rotations in feature space may be represented by: $g(R) \cdot V := V \, R$, where g(R) denotes the rotation operation in the feature space, parameterized by the 3-by-3 rotation matrix $R \in SO(3)$. The first dimension N of V may be dropped for simplicity.

The linear layer for Vector Neurons is similar to a traditional MLP: $f_{lin}(V) = WV$, where $W \in R^{C_{l+1} \times C_l}$. Such a mapping is SO(3)-equivariant:

$$g(R) \cdot f_{lin}(x) = WVR = f_{lin}(g(R) \cdot V) \qquad (1)$$

Designing nonlinearities for Vector Neuron networks is less trivial. A naive ReLu on all elements in the feature matrix will break the equivariance. Instead, a vectorized version of ReLu may be designed as the truncation of vectors along a hyperplane. Given an input feature matrix V, predict a canonical direction $k = UV \in R^{1 \times 3}$ where $U \in R^{1 \times C}$. Then the ReLU may be defined as:

$$v' = \begin{cases} v, & \text{if } \langle v, k \rangle \geq 0 \\ v - \left\langle v, \frac{k}{\|k\|} \right\rangle \frac{k}{\|k\|}, & \text{otherwise} \end{cases} \qquad (2)$$

for each row $v \in R^{1 \times 3}$ of V. This design preserves SO(3) equivariance because k and V will rotate together, and <V R, kR> = <V,k>, meaning that rotations do not change the activation. Reference [8] provides a non-limiting example for the design of pooling layers and normalization layers of Vector Neurons.

In some configurations, a SO(3)-equivariant neural network may be used to construct a feature space preserving the same rotation representations as to the input space, thus simplifying solving the rotation for feature alignment. Deep implicit representation learning and end-to-end training of registration may be used to improve the robustness of the features against noise and allow registration between two different scans of the same geometry.

Point cloud processing with an equivariant neural network for producing correspondence-free registration may be used in vehicle systems, such as vehicle camera systems, proximity sensors, or other detection systems for autonomous driving controls, automated braking, lane keeping assist, and other driving controls. In some configurations, point cloud processing may be performed by an on-board vehicle controller for controlling the vehicle or to provide driver feedback or assistance.

Referring to FIG. 1, non-limiting example steps for a method of point cloud registration are shown. Point cloud input data may be accessed or acquired at step 102 for at least a first point cloud and a second point cloud rotated with respect to the first point cloud. Point clouds may be stored on a computer system or database, or may be acquired by generating a series of points for an object, such as placing points around a 3D representation of an object. The rotated second point cloud may be rotated about an origin point with respect to the first point cloud, and otherwise the second point cloud may be similar or identical to the first point cloud.

Features may be determined and extracted from the point cloud input data, such as from both the first and rotated second point clouds, using an equivariant encoder. Features may include a collection of points, a shape determined from the point cloud, an edge of a shape determined by a group of points, and the like.

Implicit shape reconstruction may be performed at step 106 by subjecting the extracted features to a decoder. In some configurations, occupancy value prediction may be included with the implicit shape reconstruction. Occupancy value prediction may include where a decoder using an encoded shape feature and a queried position in the space as input predicts the occupancy value of the position. An optional loss or noise in the implicit shape reconstruction may be determined at step 108.

Registration in feature space may be performed at step 110 by aligning the decoded features for the first and second point clouds. The registration step may be included in a training loop for a machine learning network, directly encouraging the accurate registration of point clouds with noise. The registration may have a closed-form solution and may be differentiable, allowing end-to-end training of features.

The optimal rotation matrix to translate from the first to second point clouds may be determined at step 112. In some configurations, the optimal rotation matrix may be determined using a singular value decomposition (SVD) process as described below.

Figure 2:
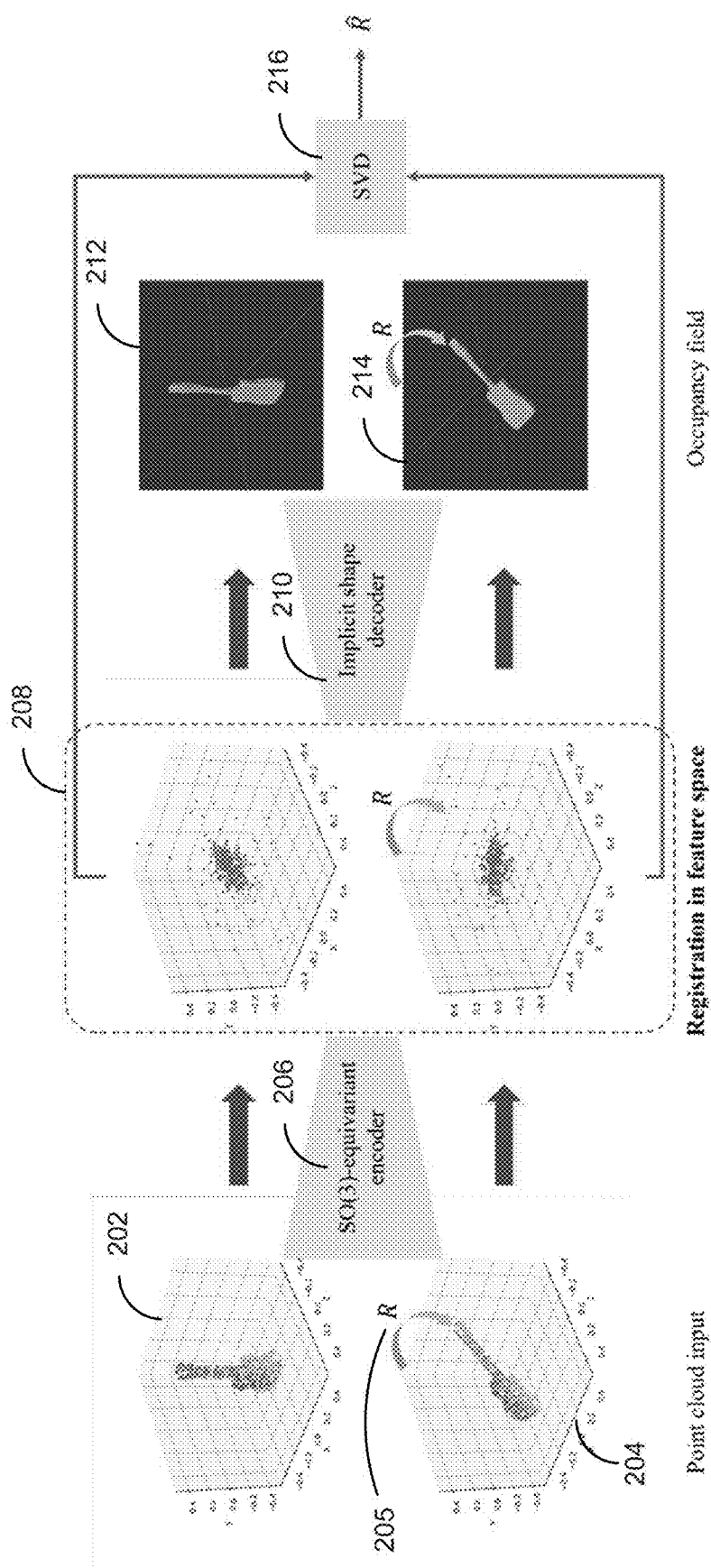
FIG. 2 is a block diagram of a non-limiting example rotational registration network.

Referring to FIG. 2, a block diagram of a non-limiting example rotational registration network is shown. A first point cloud 202 and a second point cloud 204 rotated from the first point cloud 202 by "R" 205. The first and second point clouds 202 and 204 may be provided to a equivariant encoder 206, such as an SO(3) equivariant encoder that may extract features of the point clouds. Registration in feature space may be performed with creation of registered feature space 208. An implicit shape decoder 210 may be used to generate occupancy field 212 and rotated occupancy field 214. SVD 216 may be used to determine the optimal rotation matrix to translate between the first point cloud 202 and the second point cloud 204.

Non-Limiting Example SO(3)-Equivariant Point Cloud Global Feature Extractor.

In a non-limiting example, a PointNet may be used as the feature extractor backbone. The permutation-invariant property implies that two point clouds correspond to the same feature embeddings if they only differ in the permutation of points. The layers in PointNet may be replaced with the corresponding Vector Neuron version [Ref. 8]. Denoting the feature extraction network as f, a point cloud $P \in R^{N \times 3}$, and its rotated and permuted copy $P' = MPR$, where $M \in R^{N \times N}$ is a permutation matrix and $R \in SO(3)$ is a 3-by-3 rotation matrix, then we have:

$$Q' = f(P') = f(MPR) = f(MP)R = f(P)R = QR \qquad (3)$$

where $Q := f(P) \in R^{C \times 3}$ is the feature of P extracted by the encoder. Equation (3) is guaranteed by the SO(3)-equivariance and permutation-invariance properties, which used for feature-space registration.

A Vector Neuron network may be designed to take inputs of $R^{N \times C_0 \times 3}$, while the point cloud input is $P \in R^{N \times 3}$. Simply reshaping P to $R^{N \times 1 \times 3}$ with C0=1 does not work, because a linear layer with weight $W \in R^{C_l \times 1}$ will make the resulted feature $WP \in R^{N \times C_l \times 3}$ linearly dependent in the third dimension for each point. One DGCNN edge-convolution [Ref. 7] layer may be used to initialize the $R^{N \times C_0 \times 3}$ feature from raw $R^{N \times 3}$ point cloud using the neighboring points. The k-nearest neighbor operation may be replaced with a random sampling of k points in a ball with a certain radius in the edge convolution layer. This may alleviate the sensitivity of the feature against point cloud density. In some configurations, evaluations may use k-NN.

Deep Implicit Representation Learning.

Being able to register two rotated copies of the same point cloud is not enough for practical use. In real applications, the measurements have noise, and the individual points captured by different scans generally do not correspond to the same physical points. To address these challenges, in some configurations the global feature, such as for registration, may be repurposed for implicit shape representation.

In some configurations, an encoder-decoder network may be based on an Occupancy Network [Ref. 9]. The encoder may be the aforementioned SO(3)-equivariant feature extractor f, taking a point cloud $P \in R^{N \times 3}$ as input. The decoder may take the encoded shape feature $Q=f(P) \in R^{C \times 3}$ and a queried position $p \in R^3$ as input, predicting the occupancy value of that position $v(p;Q) \in [0; 1]$. p need not be coming from P. n querying points may be sampled for each input to calculate the implicit shape reconstruction (e.g. occupancy value prediction) loss:

$$L_{OCC} = \sum_{i=1}^{n} L_{cross\_entropy}(v(p_i; f(P)), v_{gt}(p_i)), \quad (4)$$

where $v_{gt}(p) \in \{0; 1\}$ is the ground truth occupancy value of a query point p. The sampling strategy of the querying points is consistent with the Occupancy Network [Ref. 9]. The feature $f(P_1); f(P_2); \ldots$ may be encouraged to be close as long as $P_1; P_2; \ldots$ are point clouds of the same geometry.

Point Cloud Registration Through Feature Alignment

In some configurations the connection between the two point clouds P' and P in (3) may be further relaxed. The features Q and Q' may be approximately rotation-equivariant even when P and P' are not permutations of each other, as long as they are sampled on the same geometry. It may be approximate because a trained implicit shape reconstruction network may represent the implicit shape approximately. The registration step may be included in the training loop, directly encouraging the accurate registration of point clouds with noise. The registration may have a closed-form solution and may be differentiable, allowing end-to-end training of features.

In some configurations, Eq. (3) may be in the form of an orthogonal Procrustes problem. The learned features Q and Q' can be regarded as two pseudo point clouds, and each row of them may be automatically matched. This problem may have a standard closed-form solution. The cross-covariance matrix $H=Q^T Q'$ may be determined and followed by its Singular Value Decomposition (SVD) as $H=USV^T$. The optimal rotation matrix R' may be given as:

$$\hat{R}=V \Lambda U^T, \quad (5)$$

where $\Lambda=\text{diag}(1; 1; \det(V U^T)) \in R^{3 \times 3}$. The registration loss may be determined as the mean squared error between the residual rotation matrix and the identity matrix, e.g., chordal distance, as $$L_{reg}=\|R_{gt}^T R_{est}-I_3\|_F^2, \quad (6)$$

where $R_{est}$ may be determined from eq. (5), and $\|\cdot\|$ denotes the Frobenius norm.

In some configurations, the network may be trained on a ModelNet40 dataset [Ref. 10]. It may be composed of a number of CAD models. In a non-limiting example, 12311 CAD models were used from 40 categories of objects. Following the official split, 9843 models were used for training, and 2468 models were used for testing. The models were preprocessed using a tool [Ref. 11] to obtain watertight and simplified models that are centered and scaled to a unit cube. Given watertight models, the occupancy value of any 3D coordinate can be determined depending on whether it is inside or outside the model.

In a non-limiting example, a real-world indoor dataset was also used and given by: 7Scenes [Ref. 12], which is a subset of 3DMatch [Ref. 13]. A non-limiting example baseline may also be used, such as, Feature-Metric Registration (FMR) [Ref. 14]. 7Scenes consists of 7 sequences of RGBD scans of indoor environments, although the RGB information may not be used.

TABLE 1

Rotational registration error given rotated copies of point clouds. Tested using ModelNet40 official test set. The best are shown in bold. The second best are shown in italic. All values are in degrees.

| | | | Max initial rotation angle | | | | | | |
|---|---|---|---|---|---|---|---|---|---|
| | | | 0 | 30 | 60 | 90 | 120 | 150 | 180 |
| Categories | Global | Methods | Rotation error after registration | | | | | | |
| Correspondence-free | N | PCR-Net[15] | 7.08 | 9.50 | 27.38 | 68.22 | 109.61 | 129.29 | 133.49 |
| | N | FMR[14] | 0.00 | 0.45 | 5.29 | 21.95 | 42.26 | 66.39 | 79.43 |
| | Y | Ours | *0.02* | 0.02 | 0.02 | 0.02 | 0.02 | 0.02 | 0.02 |
| Correspondence-based | N | RPM-Net[16] | 0.26 | 0.27 | 0.42 | 1.57 | 2.85 | 3.42 | 4.02 |
| | Y | DeepGMR[5] | *0.02* | 0.02 | 0.02 | 0.02 | 0.02 | 0.02 | 0.02 |

The training of the network may be composed of a number of stages, such as two stages. The network may first be trained for occupancy value prediction only, after which the network may be trained for the occupancy prediction and registration tasks jointly. In the first stage, a number of points, such as 1024 points, may be randomly sampled on each mesh model as the input point cloud with a batch size, such as a size of 24. In the second stage, a pair of point clouds may be sampled on the same shape model with a different pose and number of points. The registration loss between the pair may be calculated, together with the occupancy loss of each of the point clouds. The occupancy value is queried at a number of points, such as 2048 points, in the unit cube. The batch size of such pairs may be determined as 10 in this stage.

In a non-limiting example, the dimension of the learned global feature was set as C=342, corresponding to 342× 3=1026 dimensions for a traditional feature vector. The network is trained on a single Tesla V100 GPU.

In some configurations, baseline models may be used for comparison. Representative correspondence-free methods PCRNet and FMR may be used as baselines. PointNetLK also may be used. The results for baseline non-limiting examples were based on their official open-source implementation and pretrained weights.

In all following experiments, random initial rotations are generated using the axis-angle representation, of which the angle is sampled from a uniform distribution with the specified maximum, and the rotation axis is also randomly picked. The evaluation metric is the mean isotropic rotation error as in [Ref. 16].

Non-Limiting Example Evaluation on Synthetic Data: ModelNet40

Registration with Rotated Copies of Point Clouds

We first tested the registration of two points clouds that are only different by rotation and permutation. Both point clouds had 1024 points sampled from the mesh model. The results are shown in Table 1. We can see that as local methods, both PCR-Net and FMR only work properly when the initial rotation is small because they rely on iterative refinements. In comparison, methods in accordance with the present disclosure provided consistent and almost perfect registration independent of the initial rotation angle.

Both correspondence-based methods, RPM-Net and DeepGMR, worked well in all initial conditions.

DeepGMR may also be used as a global method. The error of RPM-Net slightly increases as the initial rotation gets larger while remaining small overall, such as with inputs that are noise-free, and perfectly matching pairs of points exist in the data, facilitating the correspondence-finding process.

Registration with Rotated Copies of Point Clouds Corrupted with Gaussian Noise.

In practice, the pair of point clouds for registration will not be identical to each other. Therefore we tested the case where the source and target point clouds were both corrupted by noise. We add a Gaussian noise with =0:01 to all points before putting them through the networks. The rest of the setup is the same as in Section "Registration with rotated copies of point clouds". As shown in Table 2, PCR-Net and FMR show a similar trend of increasing error when the initial angle gets larger. Our method, though showing a slightly larger registration error, still outperforms the baseline in most columns. Most importantly, the error remains consistent across different initialization.

TABLE 2

Non-limiting example rotational registration error of noisy point clouds on ModelNet40.

| | | | Max initial rotation angle | | | | | | |
|---|---|---|---|---|---|---|---|---|---|
| | | | 0 | 30 | 60 | 90 | 120 | 150 | 180 |
| Categories | Global | Methods | Rotation error after registration | | | | | | |
| Correspondence- | N | PCR-Net[15] | 7.21 | 9.30 | 27.40 | 69.96 | 108.43 | 125.55 | 132.40 |
| free | N | FMR[14] | 1.56 | 2.01 | 5.78 | 19.95 | 45.73 | 67.65 | 82.05 |
| | Y | Ours | 2.84 | 2.95 | *2.79* | *3.58* | *3.39* | *3.40* | *3.26* |
| Correspondence- | N | RPM-Net[16] | 0.22 | 0.24 | 3.14 | 23.14 | 52.20 | 84.31 | 109.59 |
| based | Y | DeepGMR[5] | *1.73* | *1.74* | 1.76 | 1.77 | 1.75 | 1.74 | 1.74 |

TABLE 3 rotational registration error of point clouds with different densities on ModelNet40.

| | | | Max initial rotation angle | | | | | | |
|---|---|---|---|---|---|---|---|---|---|
| | | | 0 | 30 | 60 | 90 | 120 | 150 | 180 |
| Categories | Global | Methods | Rotation error after registration | | | | | | |
| Correspondence- | N | PCR-Net[15] | 7.37 | 9.70 | 27.04 | 65.95 | 109.22 | 126.43 | 130.37 |
| free | N | FMR[14] | *1.95* | *2.71* | *6.91* | 23.75 | 45.14 | 66.97 | 81.56 |
| | Y | Ours | 16.16 | 15.20 | 16.59 | 15.74 | 16.93 | 17.16 | 16.50 |
| Correspondence- | N | RPM-Net[16] | 0.48 | 0.52 | 3.53 | 23.60 | 52.70 | 84.07 | 109.62 |
| based | Y | DeepGMR[5] | 19.60 | 19.50 | 19.67 | *19.98* | *19.33* | *19.24* | *19.74* |

As the point-wise correspondence is corrupted by noise, RPM-Net deteriorates fast as the initial rotation grows. DeepGMR performs the best, showing the benefit of global methods and that its component-wise correspondence is more robust to noise. It also shows a small gap between our correspondence-free method and the state-of-the-art correspondence-based global method, motivating future improvements.

Registration with Point Clouds with Different Densities

To further test the robustness against variations in the point clouds, we tested the registration performance when given two point clouds of different densities. It is a practical challenge when the sensor changes or one conducts frame-to-model alignments. Here we sampled 1024 and 512 points for the pair of point clouds, respectively. The result is shown in Table 3. We do observe an increase of error in our method in this experiment. A possible reason is that the DGCNN layer for feature initialization at the beginning of the encoder is sensitive to the point cloud density since it takes the relative coordinate of neighboring points as inputs. Therefore, we also experimented with replacing the k-nearest neighbor with random sampling in a ball centered at each point when collecting neighboring points for the edge-convolution of that point.

With either of the strategies, the registration error is slightly larger than that of the baselines when the initial rotation angle is small but is much smaller when the initial rotation is arbitrary. We notice a similar trend in the correspondence-based methods. RPM-Net outperforms Deep-GMR if the initial rotation is small but performs much worse otherwise. Between the two global methods, DeepGMR shows a slightly larger error than ours.

Evaluation on Real-World Data: 7Scenes

The model evaluated on 7Scenes is first trained on ModelNet40 with the two stages mentioned in the Section above, and then finetuned on 7Scenes with the registration loss only. The train/test split is consistent with the work of Huang et al. [Ref. 14].

The experiments on 7Scenes consist of two parts. In the first part, the pair of point clouds are from the same frame but sampled differently. In the second part, the pair of point clouds are from adjacent frames and only overlaps partially. They reflect challenges in real-world applications since any change of the viewpoint of the sensor could result in different samples of points and visible parts.

Registration with Point Clouds that are Sampled Differently.

The original dense RGBD scan has more than 100,000 points. 1024 points were sampled randomly to form an input point cloud. The pair of point clouds went through random rotation to form the final input. In this case, the points in one point cloud were neither a noisy version nor a subset of the other.

TABLE 4 rotational registration error of point clouds sampled differently on 7Scenes.

| Methods | Max initial rotation angle | | | | | | |
|---|---|---|---|---|---|---|---|
| | 0 | 30 | 60 | 90 | 120 | 150 | 180 |
| | Rotation error after registration | | | | | | |
| FMR[14] | 1.591 | 1.605 | 6.614 | 19.829 | 39.496 | 68.463 | 84.597 |
| Ours | 4.701 | 4.319 | 4.932 | 6.070 | 5.474 | 5.189 | 5.388 |

Table 4 shows real-world scans of point clouds that are different samplings of the underlying geometry may be processed.

Rotational registration methods can estimate consistent results independent of initial rotations. The methods in accordance with the present disclosure outperform the correspondence-free baselines in all evaluation settings when the initial rotational angle is arbitrary. Experiments on synthetic and real-world data were conducted, covering conditions with noisy inputs, varying density, different sampling, and partial overlapping.

Correspondence-Based Point Cloud Registration

A major challenge here is to recover the corresponding pairs of points from a pair of point clouds. ICP simply matches the closest points together, solves the transformation, and iteratively rematches the closest points after aligning the two point clouds using the estimated transformation [Ref. 2]. Point-to-line [Ref. 17], point-to-plane [Ref. 18], plane-to-plane [Ref. 19], and Generalized-ICP [Ref. 20] build local geometric structures to the loss formulation.

Finding correspondences require strong feature descriptor for points, on which deep learning approaches show expertise. Through metric learning, a feature descriptor can be learned such that matching points are close to each other in the feature space, while non-matching points are far away.

Approaches following this idea include PPFNet [Ref. 21], 3DSmoothNet [Ref. 22], SpinNet [Ref. 23], and FCGF [Ref. 24]. Good point matching leads to accurate pose estimation when solving the orthogonal Procrustes problem. Therefore, the error in pose estimation can be used to supervise point matching and feature learning. DCP [Ref. 25], RPM-Net [Ref. 16], DGR [Ref. 26], and 3DRegNet [Ref. 27] are some of the methods leveraging ground truth pose to supervise point feature learning. Neural networks are designed to better pick the keypoints (e.g., USIP [Ref. 28] and SampleNet [Ref. 29]). Keypoint selection and feature learning may also be considered jointly. Representative works include 3DFeat-Net [Ref. 30], D3Feat [Ref. 31], DeepICP [Ref. 32], and PRNet [Ref. 33].

A remaining challenge is that such matching pairs may not exist in the input point clouds in the first place, because point clouds are sparse and a point may not be captured repeatedly by different scans. Soft matching (or many to many) [Ref. 34, 35] is proposed to address this problem. DeepGMR [Ref. 5] learns latent Gaussian Mixture Models (GMMs) for point clouds and establishes component-to-component correspondences.

Correspondence-Free Point Cloud Registration

Correspondence-free registration treats a point cloud as a whole rather than a collection of points, requiring a global representation for an entire point cloud. In this way, the limitation brought by the sparsity as mentioned above is circumvented. CVO [Ref. 36, 37] represents a point cloud as a function in a reproducing kernel Hilbert space, transforming the registration problem to maximizing the inner product of two functions. A series of deep-learning-based methods attempt to extract a global feature embedding for a point cloud and solve the registration by aligning the global features.

Examples include PointNetLK [Ref. 3], PCRNet [Ref. 15], and Feature-Metric Registration [Ref. 14]. A limitation of global-feature-based registration is that the nonlinearity of the feature extraction networks leaves us few clues about the structure and properties of the feature space. Therefore these methods rely on iterative local optimization such as the Gauss-Newton algorithm. Consequently, these methods require good initialization to achieve decent results. Our method differentiates from previous work in that the feature extraction network is SO(3) equivariant, enabling well-behaved optimization in the feature space (detailed in Sec. 3).

Group Equivariant Neural Networks

Neural networks today mainly preserve symmetry against translation, limiting the capacity of networks to deal with broader transformations presented in data. One line of work forms kernels as some steerable functions so that the rotations in the input space can be transformed into rotations in the output space [Ref. 38, 39, 40]. However, this strategy can limit the expressiveness of the feature extractor since the form of the kernels is constrained.

Another strategy is to lift the input space to a higher-dimensional space where the group is contained so that equivariance is obtained naturally [Ref. 41, 42]. However, for each lifted input to K group elements, the entire group may be integrated for computing its convolution. While being mathematically sound, this approach involves the use of group exp and log maps (for mapping from and to the Lie algebra) and a Monte Carlo approximation to compute the convolution integral over a fixed set of group elements [Ref. 42, Sections 4.2-4.4].

Cohen and Welling [Ref. 43] studied the problem of learning the irreducible representations of commutative Lie groups. Kondor and Trivedi [Ref. 41] studied the generalization of equivariance and convolution in neural networks to the action of compact groups. The latter also discussed group convolutions and their connection with Fourier analysis [Ref. 44, 45]. In this context, the convolution theorem naturally extends to the group-valued functions and the representation theory [Ref. 46].

A new design of SO(3) equivariant neural networks is proposed by Deng et al. [Ref. 8]. This approach allows incorporating the SO(3) equivariance property into existing network architectures such as PointNet and DGCNN by replacing the linear, nonlinear, pooling, and normalization layers with their vector neuron version. Our equivariant feature learner builds on this simple and useful idea.

Deep Implicit Shape Modeling

Implicit shape modeling represents a shape as a field on which a function such as an occupancy or signed distance function is defined. The surface is typically defined by the equation $f(x; y; z)=c$ for some constant c. In recent years, deep models are developed to model such implicit function fields, where a network is trained to predict the function value given a query input point coordinate.

Some representative works include DeepSDF [Ref. 47], OccNet [Ref. 9], NeRF [Ref. 48].

Implicit functions model a shape continuously, up to the infinite resolution, which offers opportunities in registration to circumvent the challenge in data association due to sparsity in point clouds.

DI-Fusion [Ref. 49] leverages deep implicit models to do surface registration and mapping by optimizing the position of the query points to minimize the absolute SDF value. iNeRF [Ref. 50] performs RGB-only registration through deep implicit models by minimizing the pixel residual between observed images and neural-rendered images. In this work, we also exploit the continuous nature of the deep implicit model but by using the learned latent feature instead of the decoded function field.

A correspondence-free rotational registration method for point clouds is provided. The method is built upon the developments in equivariant neural networks and implicit shape representation learning. We construct a feature space where the rotational relations in Euclidean space are preserved, in which registration can be done efficiently. We circumvent the need for data association and solve the rotation in closed form, achieving low errors independent of initial rotation angles. In some configurations, implicit representation learning is used with end-to-end registration to enhance the network robustness against non-ideal cases where the points are not exactly corresponding.

We conducted experiments on synthetic and real-world data, showing the network's ability to handle various input imperfections while also motivating future work for improved performance.

Figure 3:
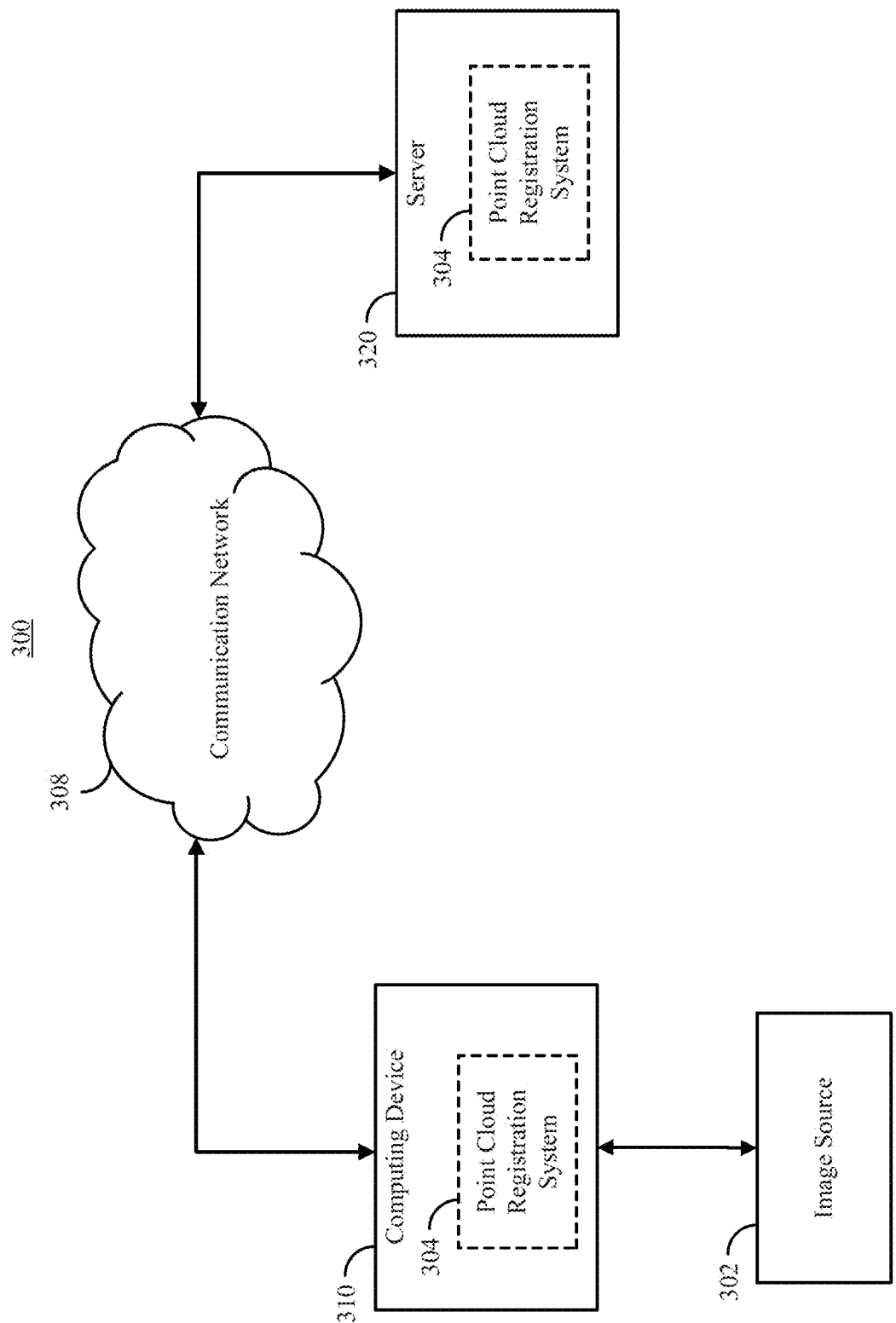
FIG. 3 is a diagram of a non-limiting example of a system for registering point clouds in accordance with some embodiments of the disclosed subject matter.

Referring to FIG. 3 an example 300 of a system for registering point clouds is shown in accordance with some embodiments of the disclosed subject matter. As shown in FIG. 3, a computing device 310 can receive multiple types of image data from an image source 302. In some configurations, computing device 310 can execute at least a portion of an point cloud registration system 304 to automatically register point clouds and determine an optimal rotation matrix for translation between point clouds.

Additionally or alternatively, in some embodiments, computing device 310 can communicate information about image data received from image source 302 to a server 320 over a communication network 308, which can execute at least a portion of automatic point cloud registration system 304 to automatically determine point cloud registrations. In such embodiments, server 320 can return information to computing device 310 (and/or any other suitable computing device) indicative of an output of automatic point cloud registration system 304 to determine point cloud registrations.

In some embodiments, computing device 310 and/or server 320 can be any suitable computing device or combination of devices, such as a desktop computer, a laptop computer, a smartphone, a tablet computer, a wearable computer, a server computer, a virtual machine being executed by a physical computing device, etc. In some configurations, automatic point cloud registration system 304 can extract features from labeled (e.g., labeled as a spatial feature, edge, point collection, and the like) data using a convolutional neural network (CNN) trained as a general image classifier, and can perform a correlation analysis to calculate correlations between the features corresponding to the image data and a database. In some embodiments, the labeled data can be used to train a classification model, such as a support vector machine (SVM), to classify features. In some embodiments, automatic point cloud registration system 304 can provide features for unlabeled image data to the trained classification model and can present a point cloud registration based on the output of the classification model (e.g., based on which class the SVM identifies the features with).

In some embodiments, image source 302 can be any suitable source of image data, such as a camera, a vehicle camera system, optical system, an MRI, CT, ultrasound, PET, SPECT, x-ray, or another computing device (e.g., a server storing image data), etc. In some embodiments, image source 302 can be local to computing device 310. For example, image source 302 can be incorporated with computing device 310 (e.g., computing device 310 can be configured as part of a device for capturing and/or storing images). As another example, image source 302 can be connected to computing device 310 by a cable, a direct wireless link, etc. Additionally or alternatively, in some embodiments, image source 302 can be located locally and/or remotely from computing device 310, and can communicate image data to computing device 310 (and/or server 320) via a communication network (e.g., communication network 308).

In some embodiments, communication network 308 can be any suitable communication network or combination of communication networks. For example, communication network 308 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 308 can be a local area network, a wide area network, a public network (e.g., the Internet), a private or semi-private network (e.g., a corporate or university intranet), any other suitable type of network, or any suitable combination of networks. Communications links shown in FIG. 3 can each be any suitable communications link or combination of communications links, such as wired links, fiber optic links, Wi-Fi links, Bluetooth links, cellular links, etc.

FIG. 4 shows an example 400 of hardware that can be used to implement image source 302, computing device 310, and/or server 320 in accordance with some embodiments of the disclosed subject matter. As shown in FIG. 4, in some embodiments, computing device 310 can include a processor 402, a display 404, one or more inputs 406, one or more communication systems 408, and/or memory 410. In some embodiments, processor 402 can be any suitable hardware processor or combination of processors, such as a central processing unit (CPU), a graphics processing unit (GPU), etc. In some embodiments, display 404 can include any suitable display devices, such as a computer monitor, a touchscreen, a television, etc. In some embodiments, inputs 406 can include any suitable input devices and/or sensors that can be used to receive user input, such as a keyboard, a mouse, a touchscreen, a microphone, etc.

In some embodiments, communications systems 408 can include any suitable hardware, firmware, and/or software for communicating information over communication network 308 and/or any other suitable communication networks. For example, communications systems 408 can include one or more transceivers, one or more communication chips and/or chip sets, etc. In a more particular example, communications systems 408 can include hardware, firmware and/or software that can be used to establish a Wi-Fi connection, a Bluetooth connection, a cellular connection, an Ethernet connection, etc.

In some embodiments, memory 410 can include any suitable storage device or devices that can be used to store instructions, values, etc., that can be used, for example, by processor 402 to present content using display 404, to communicate with server 320 via communications system(s) 408, etc. Memory 410 can include any suitable volatile memory, non-volatile memory, storage, or any suitable combination thereof. For example, memory 410 can include RAM, ROM, EEPROM, one or more flash drives, one or more hard disks, one or more solid state drives, one or more optical drives, etc. In some embodiments, memory 410 can have encoded thereon a computer program for controlling operation of computing device 310. In such embodiments, processor 402 can execute at least a portion of the computer program to present content (e.g., MRI images, user interfaces, graphics, tables, etc.), receive content from server 320, transmit information to server 320, etc.

In some embodiments, server 320 can include a processor 412, a display 414, one or more inputs 416, one or more communications systems 418, and/or memory 420. In some embodiments, processor 412 can be any suitable hardware processor or combination of processors, such as a CPU, a GPU, etc. In some embodiments, display 414 can include any suitable display devices, such as a computer monitor, a touchscreen, a television, etc. In some embodiments, inputs 416 can include any suitable input devices and/or sensors that can be used to receive user input, such as a keyboard, a mouse, a touchscreen, a microphone, etc.

In some embodiments, communications systems 418 can include any suitable hardware, firmware, and/or software for communicating information over communication network 308 and/or any other suitable communication networks. For example, communications systems 418 can include one or more transceivers, one or more communication chips and/or chip sets, etc. In a more particular example, communications systems 418 can include hardware, firmware and/or software that can be used to establish a Wi-Fi connection, a Bluetooth connection, a cellular connection, an Ethernet connection, etc.

In some embodiments, memory 420 can include any suitable storage device or devices that can be used to store instructions, values, etc., that can be used, for example, by processor 412 to present content using display 414, to communicate with one or more computing devices 310, etc. Memory 420 can include any suitable volatile memory, non-volatile memory, storage, or any suitable combination thereof. For example, memory 420 can include RAM, ROM, EEPROM, one or more flash drives, one or more hard disks, one or more solid state drives, one or more optical drives, etc. In some embodiments, memory 420 can have encoded thereon a server program for controlling operation of server 320. In such embodiments, processor 412 can execute at least a portion of the server program to transmit information and/or content (e.g., MRI data, results of automatic diagnosis, a user interface, etc.) to one or more computing devices 310, receive information and/or content from one or more computing devices 310, receive instructions from one or more devices (e.g., a personal computer, a laptop computer, a tablet computer, a smartphone, etc.), etc.

In some embodiments, image source 302 can include a processor 422, imaging components 424, one or more communications systems 426, and/or memory 428. In some embodiments, processor 422 can be any suitable hardware processor or combination of processors, such as a CPU, a GPU, etc. In some embodiments, imaging components 424 can be any suitable components to generate image data corresponding to one or more imaging modes (e.g., T1 imaging, T2 imaging, fMRI, etc.). An example of an imaging machine that can be used to implement image source 302 can include a conventional MRI scanner (e.g., a 1.5 T scanner, a 3 T scanner), a high field MRI scanner (e.g., a 7 T scanner), an open bore MRI scanner, a CT system, an ultrasound scanner and the like.

Note that, although not shown, image source 302 can include any suitable inputs and/or outputs. For example, image source 302 can include input devices and/or sensors that can be used to receive user input, such as a keyboard, a mouse, a touchscreen, a microphone, a trackpad, a trackball, hardware buttons, software buttons, etc. As another example, image source 302 can include any suitable display devices, such as a computer monitor, a touchscreen, a television, etc., one or more speakers, etc.

In some embodiments, communications systems 426 can include any suitable hardware, firmware, and/or software for communicating information to computing device 310 (and, in some embodiments, over communication network 308 and/or any other suitable communication networks). For example, communications systems 426 can include one or more transceivers, one or more communication chips and/or chip sets, etc. In a more particular example, communications systems 426 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, etc.

In some embodiments, memory 428 can include any suitable storage device or devices that can be used to store instructions, values, image data, etc., that can be used, for example, by processor 422 to: control imaging components 424, and/or receive image data from imaging components 424; generate images; present content (e.g., MRI images, a user interface, etc.) using a display; communicate with one or more computing devices 310; etc. Memory 428 can include any suitable volatile memory, non-volatile memory, storage, or any suitable combination thereof. For example, memory 428 can include RAM, ROM, EEPROM, one or more flash drives, one or more hard disks, one or more solid state drives, one or more optical drives, etc. In some embodiments, memory 428 can have encoded thereon a program for controlling operation of image source 302. In such embodiments, processor 422 can execute at least a portion of the program to generate images, transmit information and/or content (e.g., MRI image data) to one or more computing devices 310, receive information and/or content from one or more computing devices 310, receive instructions from one or more devices (e.g., a personal computer, a laptop computer, a tablet computer, a smartphone, etc.), etc.

The present disclosure has described one or more example embodiments, and it should be appreciated that many equivalents, alternatives, variations, and modifications, aside from those expressly stated, are possible and within the scope of the invention.

REFERENCES

[1] B. K. P. Horn, H. M. Hilden, and S. Negandaripour. Closed-form solution of absolute orientation using orthonormal matrices. J. Opt. Soc. Am. A, 5(7):1127-1135, July 1988. doi:10.1364/JOSAA.5.001127.

[2] P. J. Besl and N. D. McKay. A method for registration of 3-d shapes. IEEE Trans. Pattern Anal. Mach. Intell., 14(2):239-256, February 1992. ISSN 1939-3539. doi:10.1109/34.121791.

[3] Y. Aoki, H. Goforth, R. A. Srivatsan, and S. Lucey. PointNetLK: Robust & efficient point cloud registration using pointnet. In Proc. IEEE Conf. Comput. Vis. Pattern Recog., June 2019.

[4] R. W. Wedderburn. Quasi-likelihood functions, generalized linear models, and the gauss—newton method. Biometrika, 61(3):439-447, 1974.

[5] W. Yuan, B. Eckart, K. Kim, V. Jampani, D. Fox, and J. Kautz. DeepGMR: Learning latent Gaussian mixture models for registration. In Proc. European Conf. Comput. Vis., pages 733-750. Springer, 2020.

[6] C. R. Qi, H. Su, K. Mo, and L. J. Guibas. Pointnet: Deep learning on point sets for 3d classification and segmentation. arXiv preprint arXiv:1612.00593, 2016.

[7] Y. Wang, Y. Sun, Z. Liu, S. E. Sarma, M. M. Bronstein, and J. M. Solomon. Dynamic graph cnn for learning on point clouds. ACM Transactions on Graphics (TOG), 38(5):1-12, 2019.

[8] C. Deng, 0. Litany, Y. Duan, A. Poulenard, A. Tagliasacchi, and L. Guibas. Vector neurons: A general framework for 50(3)-equivariant networks. arXiv preprint arXiv:2104.12229, 2021.

[9] L. Mescheder, M. Oechsle, M. Niemeyer, S. Nowozin, and A. Geiger. Occupancy networks: Learning 3d reconstruction in function space. In Proc. IEEE Conf. Comput. Vis. Pattern Recog., pages 4460-4470, 2019.

[10] Z. Wu, S. Song, A. Khosla, F. Yu, L. Zhang, X. Tang, and J. Xiao. 3d shapenets: A deep representation for volumetric shapes. In Proc. IEEE Conf. Comput. Vis. Pattern Recog., pages 1912-1920, 2015.

[11] D. Stutz and A. Geiger. Learning 3d shape completion under weak supervision. CoRR, abs/1805.07290, 2018.

[12] J. Shotton, B. Glocker, C. Zach, S. Izadi, A. Criminisi, and A. Fitzgibbon. Scene coordinate regression forests for camera relocalization in rgb-d images. In Proc. IEEE Conf. Comput. Vis. Pattern Recog. IEEE, June 2013.

[13] A. Zeng, S. Song, M. Niegner, M. Fisher, J. Xiao, and T. Funkhouser. 3dmatch: Learning local geometric descriptors from rgb-d reconstructions. In Proc. IEEE Conf. Comput. Vis. Pattern Recog., 2017.

[14] X. Huang, G. Mei, and J. Zhang. Feature-metric registration: A fast semi-supervised approach for robust point cloud registration without correspondences. In Proc. IEEE Conf. Comput. Vis. Pattern Recog., pages 11366-11374, 2020.

[15] V. Sarode, X. Li, H. Goforth, Y. Aoki, R. A. Srivatsan, S. Lucey, and H. Choset. Pcrnet: Point cloud registration network using pointnet encoding. ArXiv, abs/1908.07906, 2019.

[16] Z. J. Yew and G. H. Lee. Rpm-net: Robust point matching using learned features. In Proc. IEEE Conf. Comput. Vis. Pattern Recog., pages 11824-11833, 2020.

[17] A. Censi. An ICP variant using a point-to-line metric. In Proc. IEEE Int. Conf. Robot. and Automation, pages 19-25. IEEE, 2008.

[18] Y. Chen and G. G. Medioni. Object modeling by registration of multiple range images. Image Vision Comput., 10(3):145-155, 1992.

[19] N. J. Mitra, N. Gelfand, H. Pottmann, and L. Guibas. Registration of point cloud data from a geometric optimization perspective. In Proceedings of the 2004 Eurographics/ACM SIGGRAPH Symposium on Geometry Processing, SGP '04, page 22-31, New York, NY, USA, 2004. Association for Computing Machinery. doi:10.1145/1057432.1057435.

[20] A. Segal, D. Haehnel, and S. Thrun. Generalized-ICP. In Robotics: science and systems, volume 2, page 435. Seattle, WA, 2009.

[21] H. Deng, T. Birdal, and S. Ilic. Ppfnet: Global context aware local features for robust 3d point matching. In Proc. IEEE Conf. Comput. Vis. Pattern Recog., pages 195-205, 2018.

[22] Z. Gojcic, C. Zhou, J. D. Wegner, and A. Wieser. The perfect match: 3d point cloud matching with smoothed densities. In Proc. IEEE Conf. Comput. Vis. Pattern Recog., pages 5545-5554, 2019.

[23] S. Ao, Q. Hu, B. Yang, A. Markham, and Y. Guo. Spinnet: Learning a general surface descriptor for 3d point cloud registration. In Proc. IEEE Conf. Comput. Vis. Pattern Recog., 2021.

[24] C. Choy, J. Park, and V. Koltun. Fully convolutional geometric features. In Proc. IEEE Int. Conf. Comput. Vis., 2019.

[25] Y. Wang and J. M. Solomon. Deep closest point: Learning representations for point cloud registration. In Proc. IEEE Int. Conf. Comput. Vis., pages 3523-3532, 2019.

[26] C. Choy, W. Dong, and V. Koltun. Deep global registration. In Proc. IEEE Conf. Comput. Vis. Pattern Recog., 2020.

[27] G. D. Pais, S. Ramalingam, V. M. Govindu, J. C. Nascimento, R. Chellappa, and P. Miraldo. 3DRegNet: A deep neural network for 3d point registration. In Proc. IEEE Conf. Comput. Vis. Pattern Recog., pages 7193-7203, 2020.

[28] J. Li and G. H. Lee. Usip: Unsupervised stable interest point detection from 3d point clouds. In Proc. IEEE Int. Conf. Comput. Vis., pages 361-370, 2019.

[29] I. Lang, A. Manor, and S. Avidan. SampleNet: Differentiable point cloud sampling. In Proc. IEEE Conf. Comput. Vis. Pattern Recog., pages 7578-7588, 2020.

[30] Z. J. Yew and G. H. Lee. 3dfeat-net: Weakly supervised local 3d features for point cloud registration. In ECCV, 2018.

[31] X. Bai, Z. Luo, L. Zhou, H. Fu, L. Quan, and C.-L. Tai. D3Feat: Joint learning of dense detection and description of 3d local features. In Proc. IEEE Conf. Comput. Vis. Pattern Recog., pages 6359-6367, 2020.

[32] W. Lu, G. Wan, Y. Zhou, X. Fu, P. Yuan, and S. Song. Deepvcp: An end-to-end deep neural network for point cloud registration. In Proceedings of the IEEE/CVF International Conference on Computer Vision, pages 12-21, 2019.

[33] Y. Wang and J. M. Solomon. Prnet: Self-supervised learning for partial-to-partial registration. In H. Wallach, H. Larochelle, A. Beygelzimer, F. d'Alch'e-Buc, E. Fox, and R. Garnett, editors, Advances in Neural Information Processing Systems 32, pages 8814-8826. Curran Asso-

[34] S. Gold, A. Rangarajan, C.-P. Lu, S. Pappu, and E. Mjolsness. New algorithms for 2D and 3D point matching: Pose estimation and correspondence. Pattern recognition, 31(8):1019-1031, 1998.

[35] S. Granger and X. Pennec. Multi-scale EM-ICP: A fast and robust approach for surface registration. In Proc. European Conf. Comput. Vis., pages 418-432, 2002.

[36] M. Ghaffari, W. Clark, A. Bloch, R. M. Eustice, and J. W. Grizzle. Continuous direct sparse visual odometry from RGB-D images. In Proc. Robot: Sci. Syst. Conf., Freiburg, Germany, June 2019.

[37] R. Zhang, T.-Y. Lin, C. E. Lin, S. A. Parkison, W. Clark, J. W. Grizzle, R. M. Eustice, and M. Ghaffari. A new framework for registration of semantic point clouds from stereo and RGB-D cameras. In Proc. IEEE Int. Conf. Robot. and Automation, pages 1-8, 2021.

[38] T. S. Cohen and M. Welling. Steerable cnns. arXiv preprint arXiv:1612.08498, 2016.

[39] C. Esteves, C. Allen-Blanchette, A. Makadia, and K. Daniilidis. Learning so (3) equivariant representations with spherical cnns. In Proc. European Conf. Comput. Vis., pages 52-68, 2018.

[40] F. B. Fuchs, D. E.Worrall, V. Fischer, and M.Welling. Se (3)-transformers: 3d roto-translation equivariant attention networks. arXiv preprint arXiv:2006.10503, 2020.

[41] R. Kondor and S. Trivedi. On the generalization of equivariance and convolution in neural networks to the action of compact groups. In International Conference on Machine Learning, pages 2747-2755. PMLR, 2018.

[42] M. Finzi, S. Stanton, P. Izmailov, and A. G.Wilson. Generalizing convolutional neural networks for equivariance to Lie groups on arbitrary continuous data. In International Conference on Machine Learning, pages 3165-3176. PMLR, 2020.

[43] T. Cohen and M. Welling. Learning the irreducible representations of commutative lie groups. In International Conference on Machine Learning, pages 1755-1763. PMLR, 2014.

[44] G. S. Chirikjian and A. B. Kyatkin. Engineering applications of noncommutative harmonic analysis: with emphasis on rotation and motion groups. CRC Press, 2001. doi:10.1201/9781420041767.

[45] G. S. Chirikjian. Stochastic models, information theory, and Lie groups, volume 2: Analytic methods and modern applications, volume 2. Springer Science & Business Media, 2009.

[46] B. Hall. Lie groups, Lie algebras, and representations: an elementary introduction, volume 222. Springer, 2015.

[47] J. J. Park, P. Florence, J. Straub, R. Newcombe, and S. Lovegrove. Deepsdf: Learning continuous signed distance functions for shape representation. In Proc. IEEE Conf. Comput. Vis. Pattern Recog., pages 165-174, 2019.

[48] B. Mildenhall, P. P. Srinivasan, M. Tancik, J. T. Barron, R. Ramamoorthi, and R. Ng. Nerf: Representing scenes as neural radiance fields for view synthesis. In Proc. European Conf. Comput. Vis., pages 405-421. Springer, 2020.

[49] J. Huang, S.-S. Huang, H. Song, and S.-M. Hu. Difusion: Online implicit 3d reconstruction with deep priors. arXiv preprint arXiv:2012.05551, 2020.

[50] L. Yen-Chen, P. Florence, J. T. Barron, A. Rodriguez, P. Isola, and T.-Y. Lin. inerf: Inverting neural radiance fields for pose estimation. arXiv preprint arXiv:2012.05877, 2020.

The citation of any document is not to be construed as an admission that it is prior art with respect to the present invention.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

The invention claimed is:

1. A method for point cloud registration, comprising:
   accessing point cloud input data that includes at least a first point cloud and a second point cloud,
      wherein the second point cloud is rotated from the first point cloud about an origin;
   subjecting the point cloud input data to an equivariant encoder to extract features from the point cloud input data;
   performing shape reconstruction by subjecting the extracted features to a decoder;
   performing registration in feature space by aligning the decoded features for the first point cloud and second point cloud;
   determining an optimized rotation matrix to translate between the first point cloud and the second point cloud.

2. The method of claim 1, wherein the point cloud registration is correspondence-free and includes SO(3)-equivariance representation learning with a neural network.

3. The method of claim 1, wherein the point cloud registration generates a closed-form solution.

4. The method of claim 1, further comprising determining an occupancy value prediction.

5. The method of claim 4, wherein occupancy value prediction includes where the decoder uses an encoded shape feature and a queried position in a feature space.

6. The method of claim 1, further comprising determining a loss in the shape reconstruction given by:

$$L_{OCC} = \sum_{i=1}^{n} L_{cross\_entropy}(v(p_i; f(P)), v_{gt}(p_i)),$$

where $L_{occ}$ represents occupancy value loss, $v_{gt}(p) \in \{0; 1\}$ represents a ground truth occupancy value of a query point p; $f(P_1)$; $f(P_2)$, represents a feature of the point clouds $P_1$; $P_2$.

7. The method of claim 1, wherein the optimized rotation matrix is determined using a singular value decomposition (SVD).

8. The method of claim 1, wherein the point cloud registration is independent of at least one of initial rotation error, input point clouds, noise, sampling, and density differences.

9. The method of claim 1, wherein the point cloud registration is performed using a neural network.

10. The method of claim 1, wherein the point cloud registration is performed by a vehicle system to control autonomous driving.

11. A system for point cloud registration, comprising:
a computer system configured to:
  i) access point cloud input data that includes at least a first point cloud and a second point cloud,
  wherein the second point cloud is rotated from the first point cloud about an origin;
  ii) subject the point cloud input data to an equivariant encoder to extract features from the point cloud input data;
  iii) perform shape reconstruction by subjecting the extracted features to a decoder;
  iv) perform registration in feature space by aligning the decoded features for the first point cloud and second point cloud;
  v) determine an optimized rotation matrix to translate between the first point cloud and the second point cloud.

12. The system of claim 11, wherein the point cloud registration is correspondence-free and includes SO(3)-equivariance representation learning with a neural network.

13. The system of claim 11, wherein the point cloud registration generates a closed-form solution.

14. The system of claim 11, wherein the computer system is further configured to determine an occupancy value prediction.

15. The system of claim 14, wherein occupancy value prediction includes where the decoder uses an encoded shape feature and a queried position in a feature space.

16. The system of claim 11, wherein the computer system is further configured to determine a loss in the shape reconstruction given by:

$$L_{OCC} = \sum_{i=1}^{n} L_{cross\_entropy}(v(p_i; f(P)), v_{gt}(p_i)),$$

where $L_{occ}$ represents occupancy value loss, $v_{gt}(p) \in \{0; 1\}$ represents a ground truth occupancy value of a query point p; $f(P_1)$; $f(P_2)$, represents a feature of the point clouds $P_1$; $P_2$.

17. The system of claim 11, wherein the computer system is further configured to determine the optimized rotation matrix using a singular value decomposition (SVD).

18. The system of claim 11, wherein the point cloud registration is independent of at least one of initial rotation error, input point clouds, noise, sampling, and density differences.

19. The system of claim 11, wherein the computer system is further configured to perform point cloud registration using a neural network.

20. The system of claim 11, wherein the computer system is further configured to perform point cloud registration with a vehicle system to control autonomous driving.

* * * * *

UNITED STATES PATENT AND TRADEMARK OFFICE
CERTIFICATE OF CORRECTION

| | | |
|---|---|---|
| PATENT NO. | : 12,243,185 B2 | Page 1 of 1 |
| APPLICATION NO. | : 17/852636 | |
| DATED | : March 4, 2025 | |
| INVENTOR(S) | : Minghan Zhu et al. | |

It is certified that error appears in the above-identified patent and that said Letters Patent is hereby corrected as shown below:

In the Specification

Column 17, Line 7, "Negandaripour" should be --Negahdaripour--.

Column 17, Line 36, "50(3)-equivariant" should be --SO(3)-equivariant--.

Column 17, Line 52, "Neigner" should be --Neißner--.

Signed and Sealed this
Twenty-ninth Day of April, 2025

Coke Morgan Stewart
*Acting Director of the United States Patent and Trademark Office*